Sept. 30, 1958    E. W. VREDENBURG    2,853,842
APPARATUS FOR FILLING AND CLOSING BAGS
Filed June 27, 1955    9 Sheets-Sheet 4
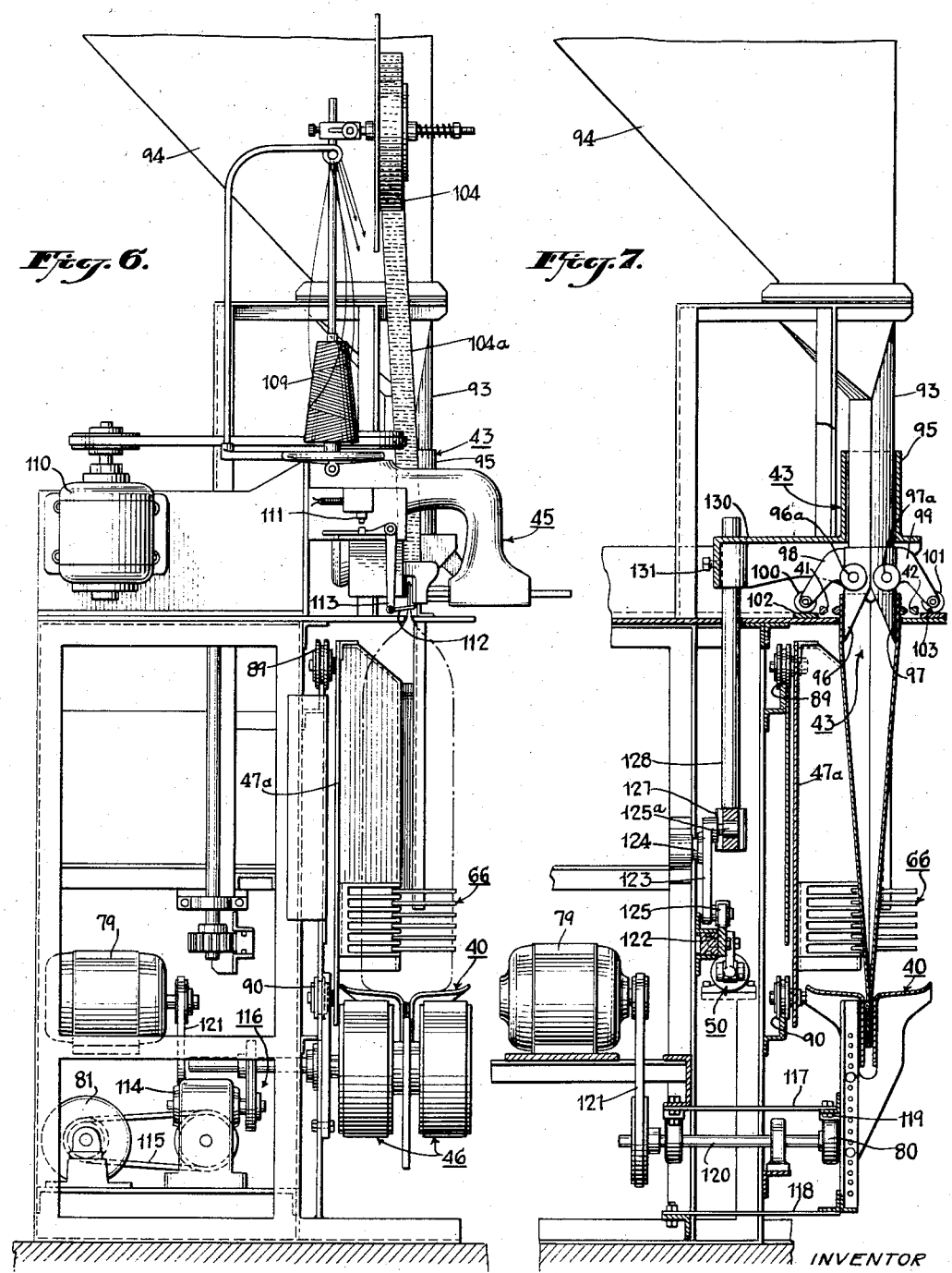
INVENTOR
BY    EDRIC W. VREDENBURG.
Ward Neal Haselton Orme & McElhannon
ATTORNEYS.

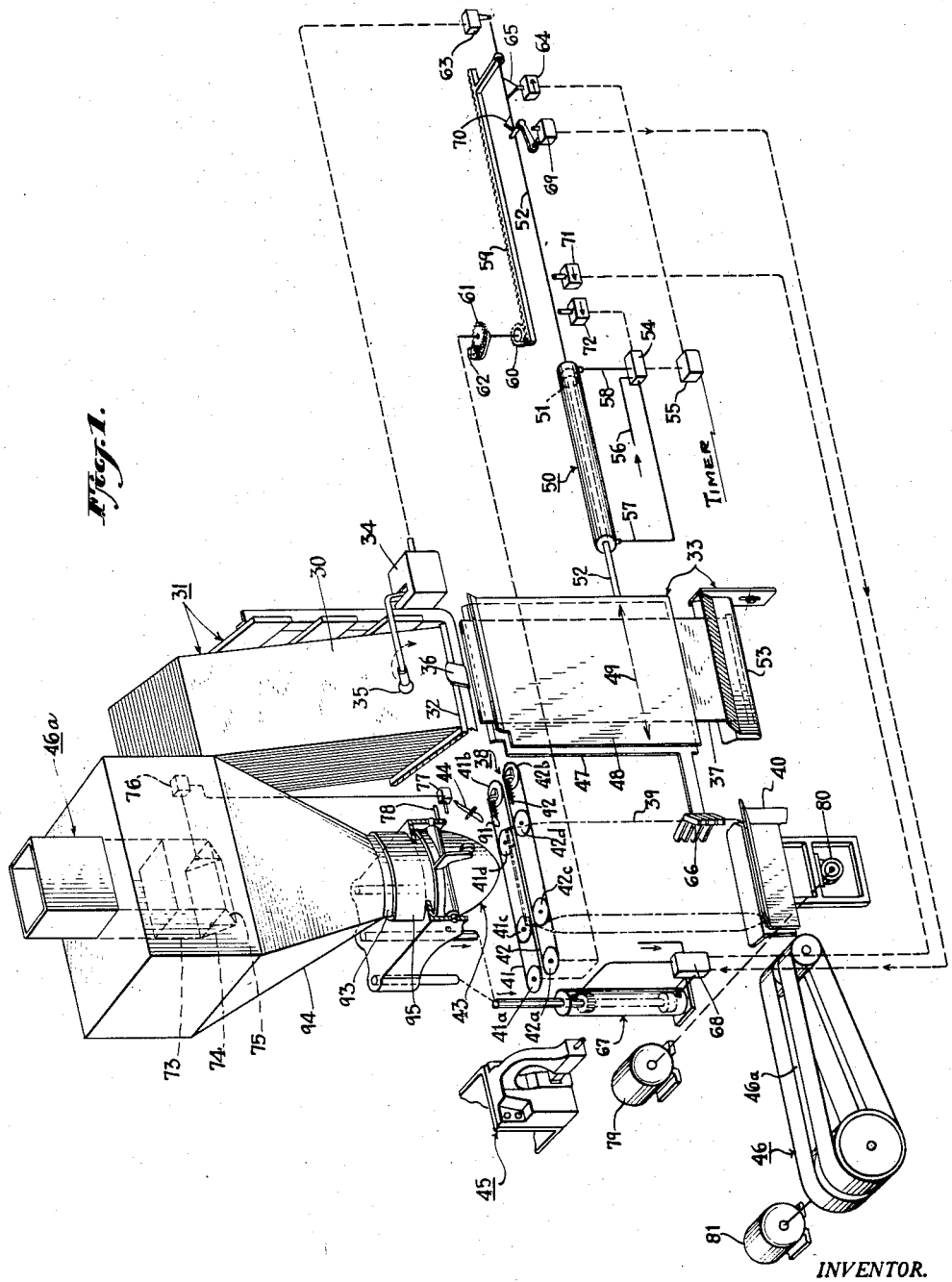

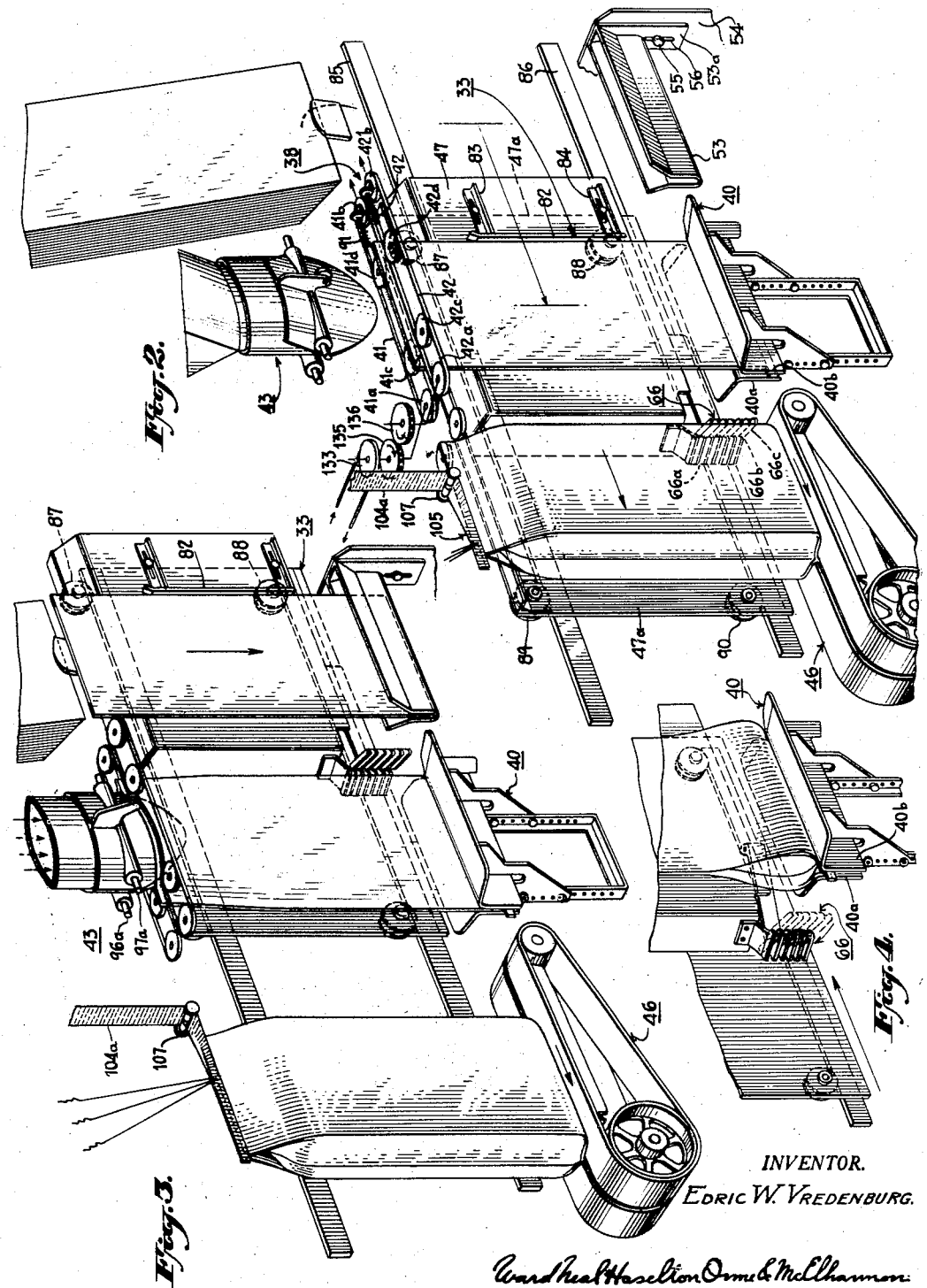

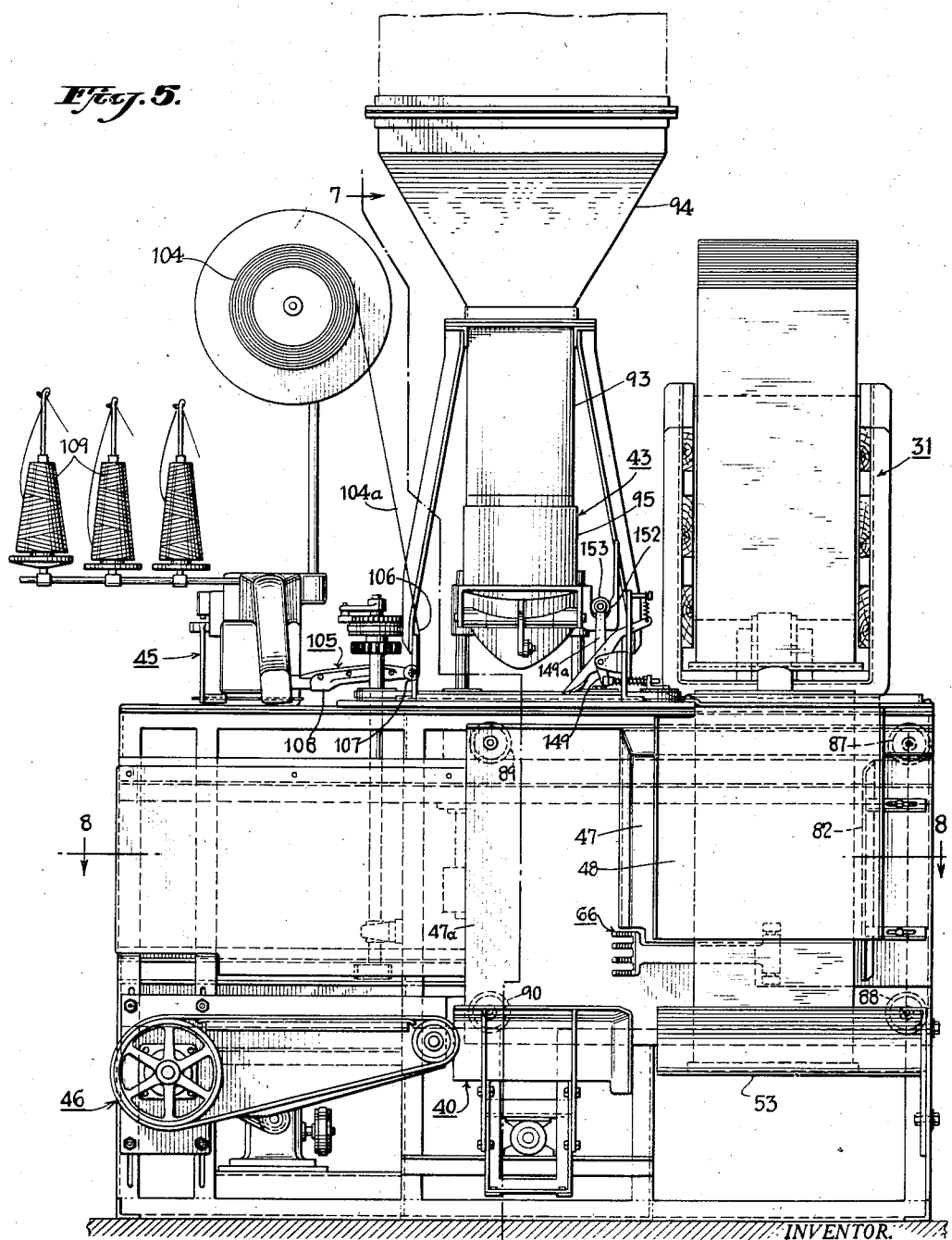

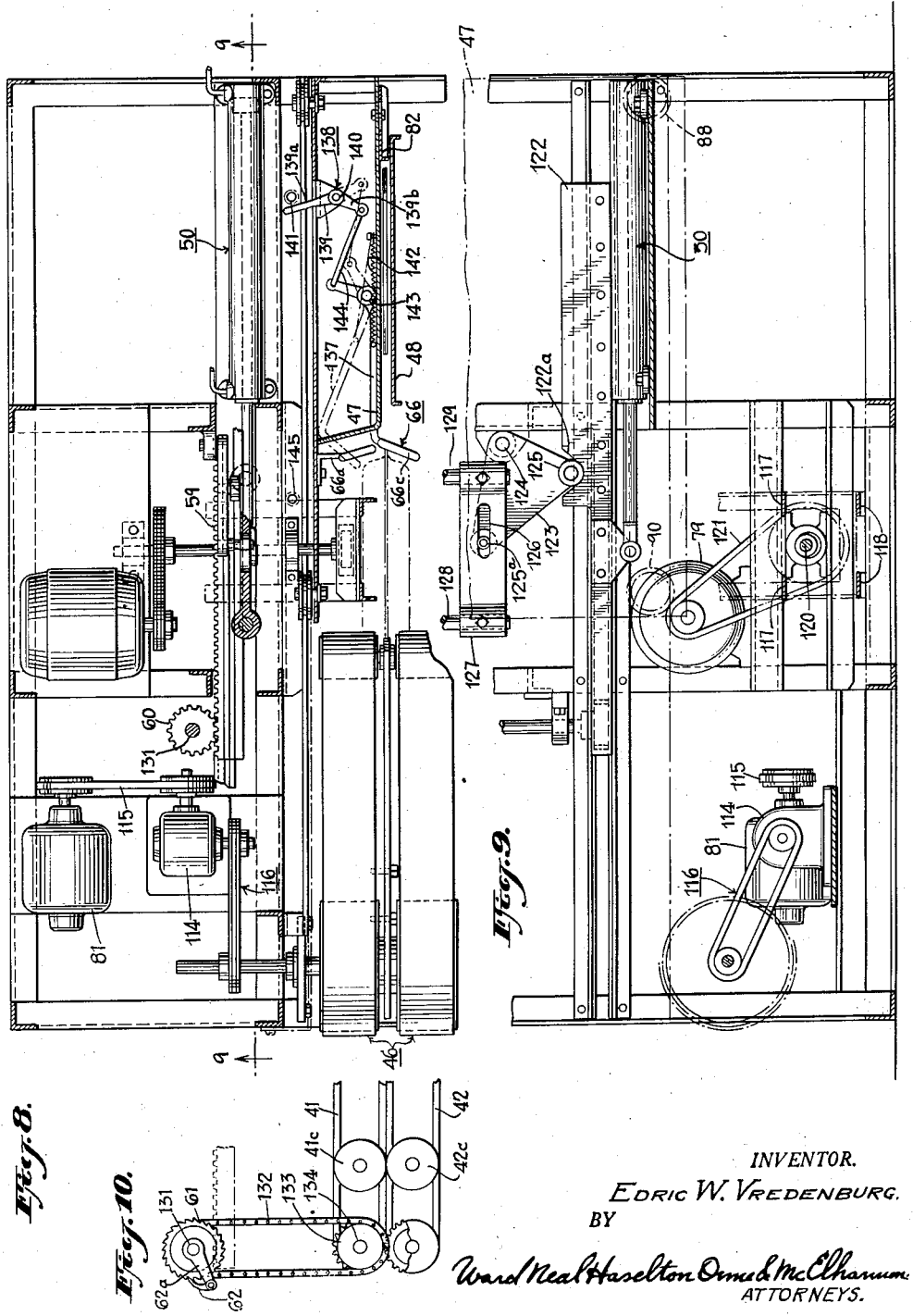

Sept. 30, 1958     E. W. VREDENBURG     2,853,842
APPARATUS FOR FILLING AND CLOSING BAGS
Filed June 27, 1955     9 Sheets-Sheet 6
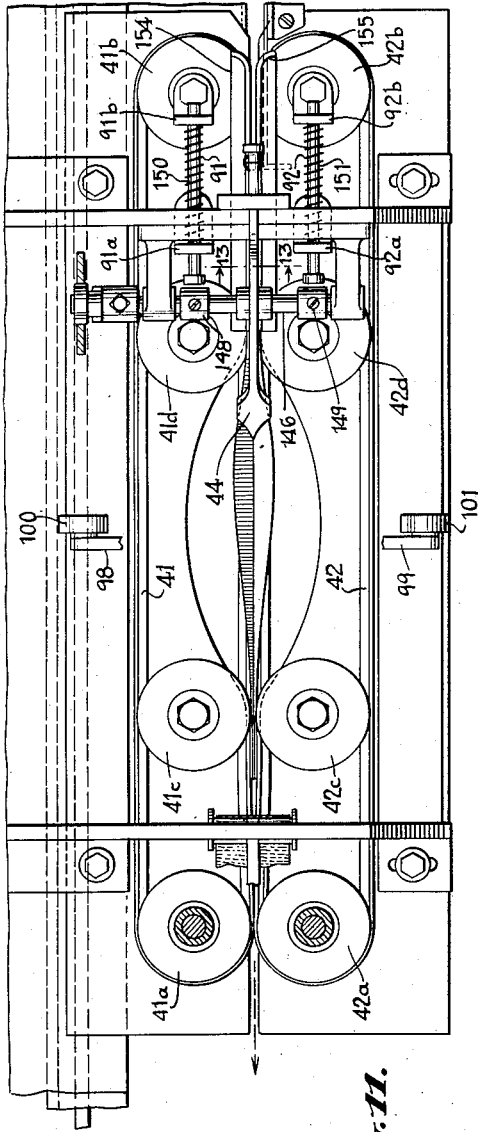
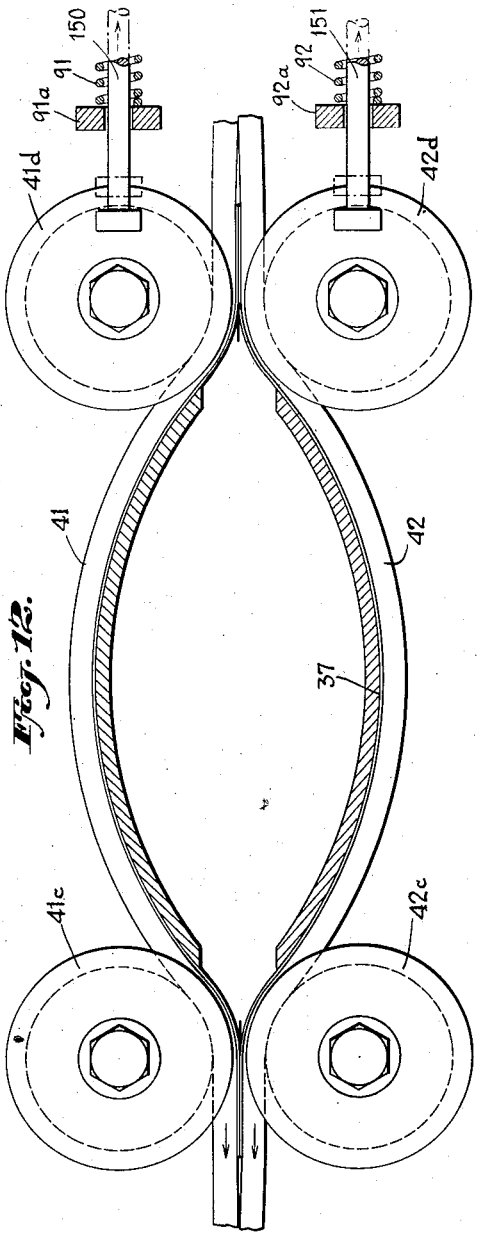
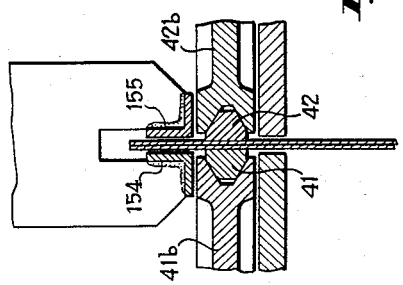
INVENTOR.
*Edric W. Vredenburg.*
BY
*Ward Neal Haselton Orme & McElhannon*
ATTORNEYS.

Sept. 30, 1958  E. W. VREDENBURG  2,853,842
APPARATUS FOR FILLING AND CLOSING BAGS
Filed June 27, 1955  9 Sheets-Sheet 7
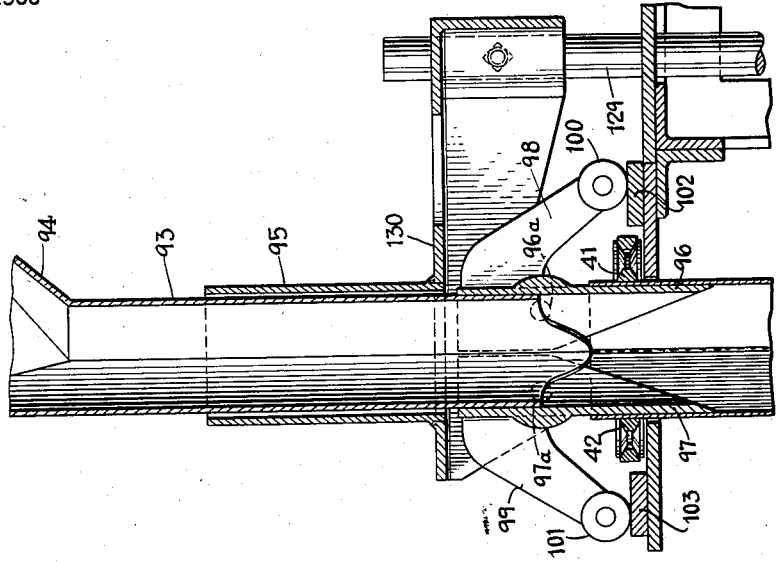
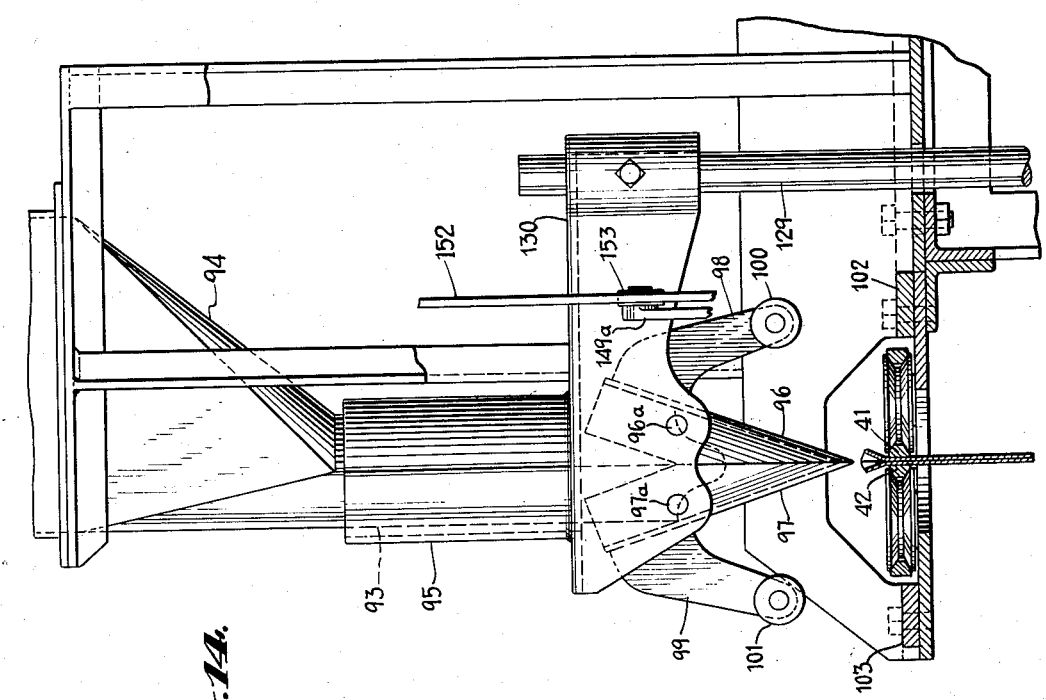
INVENTOR.
EDRIC W. VREDENBURG
BY
Ward Neal Hamilton Orme & McElhannon
ATTORNEYS.

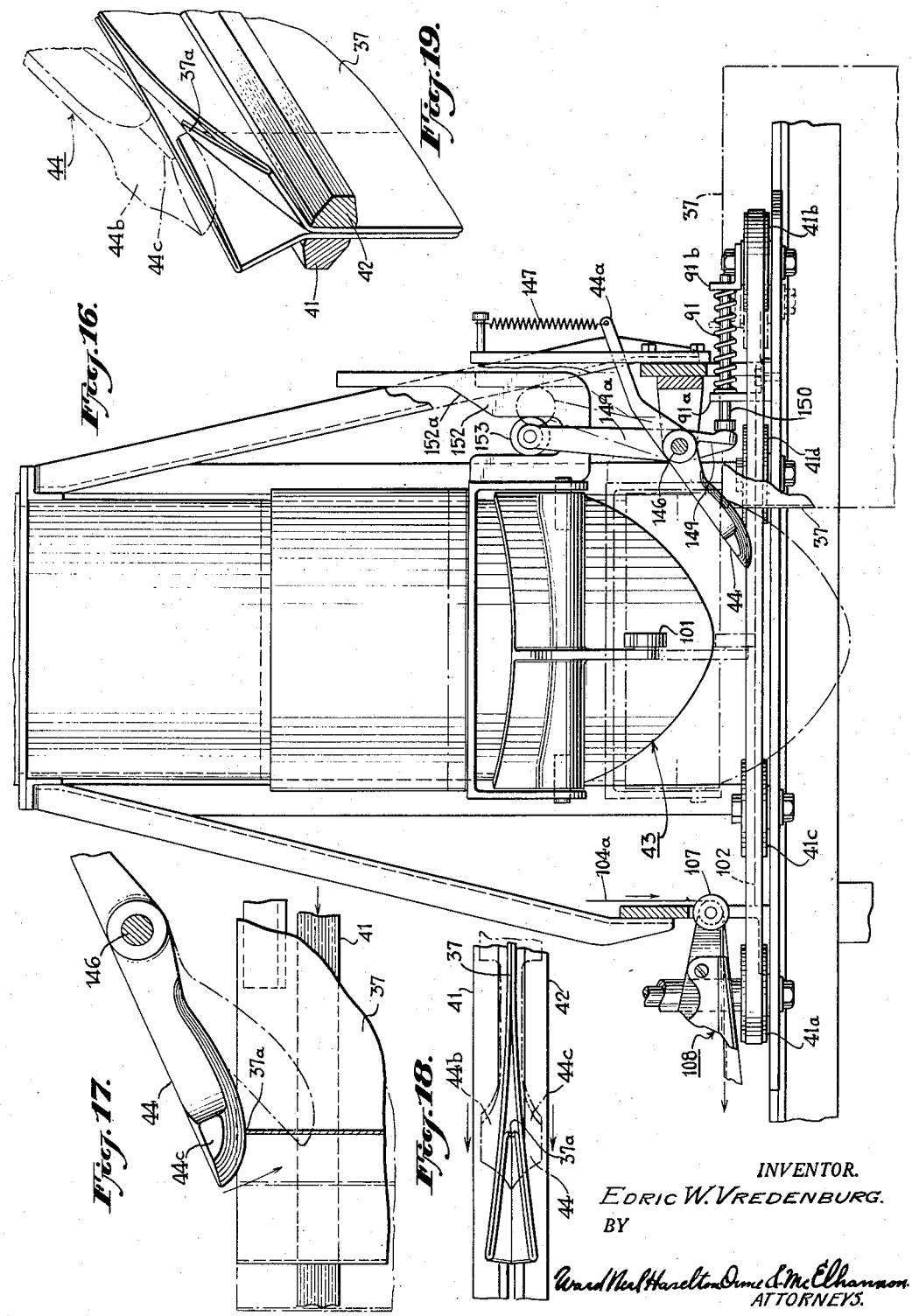

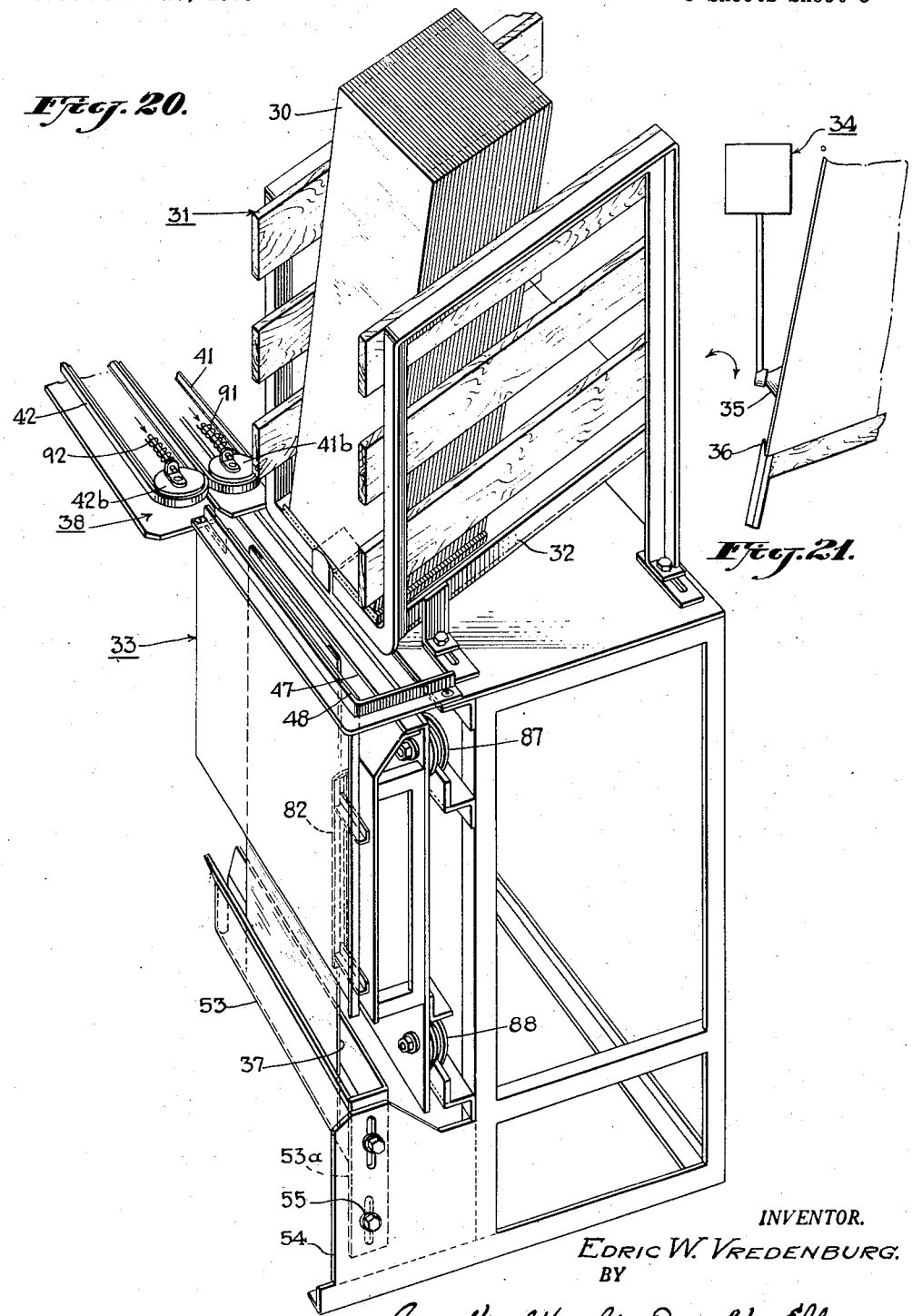

United States Patent Office 2,853,842
Patented Sept. 30, 1958

2,853,842

APPARATUS FOR FILLING AND CLOSING BAGS

Edric W. Vredenburg, Oakland, Calif., assignor to St. Regis Paper Company, New York, N. Y., a corporation of New York Application June 27, 1955, Serial No. 518,160

20 Claims. (Cl. 53—384)

This invention relates to apparatus for filling bags of the open mouth type, namely, bags having one end initially open and the other closed.

The invention more particularly relates to apparatus for automatically directing in succession a plurality of flat empty bags of such type in substantially upright attitude to a filling station beneath a filling spout, the mouths of each bag at the time for spout insertion being resiliently urged toward a closed condition and thereby being resiliently spreadable and contractable responsive to the insertion and withdrawal of a tapered mouth of such filling spout. Such bag directing apparatus includes novel bag top conveyor means which thus performs three main functions, namely: (a) to grasp each bag all along its top margin a selected distance below its top edge thereby to support same for filling; (b) to convey the bag into such filling station for which purpose the bag conveyor is mounted for movement; and (c) resiliently to urge the mouth of the bag towards a closed condition thereby to be resiliently spreadable and contractable as aforementioned. The upper margin of the bag which extends above such novel bag top conveyor coacts with novel preliminary bag mouth opening means which is capable of spreading apart such upwardly extending marginal portions which protrude above the conveyor thereby to prepare the bag mouth for the insertion of the vertically movable bag filling spout, the mouth of the latter normally being closed and tapered to a lip adapted for insertion into the bag mouth. Such novel bag top conveyor, by virtue of its resilient urging of the bag mouth toward a closed condition when engaging the spout, is adapted to yield as the filling spout is inserted therein in such a way that the bag mouth is caused tightly to hug the adjacent portions of the bag spout thereby preventing escape of dust laden air. The conveyor maintains a firm grip on the bag mouth at all times and preferably has bag gripping surfaces of rubber or rubber-like material which prevents any appreciable slipping of the bag mouth relative thereto during insertion and withdrawal of the spout.

The invention is well adapted among other purposes for use in combination with bag closing apparatus of the type wherein a conveyor is provided for conveying filled bags in succession to a sewing machine with the upper wall portions of such bags in opposed upstanding positions generally parallel to the conveyor path and ready to be closed by a sewn seam. Usually such apparatus also includes means for applying a closure tape along and astride the mouth of the bag, which tape becomes fixed in place by the aforementioned seam.

Apparatus of this general type heretofore proposed have not been capable automatically, accurately and rapidly of filling a succession of open mouth type bags with granulated or pulverulent material and have reqired the continued attention of at least one operator.

Furthermore, apparatus heretofore suggested for filling open mouth type bags with substantial charges of divided or pulverulent material have been unable to do so without elaborate and expensive precautions to prevent the escape of substantial amounts of dust laden air.

One of the objects of the present invention is to overcome these disadvantages or to reduce same to insignificance.

A further object is to provide a novel open mouth bag filling apparatus which coacts with means for automatically feeding empty bags thereto to be filled.

A further object is to provide novel apparatus of this character for automatically inserting a preweighed charge into each of a succession of open mouth bags, the automatic apparatus requiring little or no attention from an operator with the exception of feeding a bag magazine thereof with empty bags.

The invention, in one aspect thereof, is constituted by a novel device for grasping the top region of an empty flat bag in a substantially vertical attitude and moving same into a bag filling station, such means comprising a pair of endless belts which are mounted with selected or bag gripper portions thereof adjacent to and pressed against one another by suitable means, including, for example, rotatable pulleys, the adjacent portions of the endless belts preferably moving along a straight line in a selected direction. Such adjacent belt portions extend substantially horizontally along the aforementioned selected line or path to such bag filling station. Preferably the two endless belts are of substantially equal length and are stretched taut each between a pair of pulleys, at least one of the pulleys of each pair being mounted for rotation upon an axis which can shift resiliently to accommodate the spreading apart of such selected adjacent belt portions in response to the insertion of a tapered spout into a bag mouth held between such adjacent belt portions. Bag bottom support means are provided beneath such belts and filling station and are conformed to support a bag bottom in a desired attitude while the bag is being conveyed to such filling station by such bag top conveyor and while being filled. An empty bag is fed to the conveyor in a substantially upright condition in such a way that the top region thereof at a leading side edge is first grasped between such adjacent portions of the endless belts with a selected top margin protruding above the belts. The belts progressively pull the bag fully therebetween. The bottom of such bag may move slidably along the aforementioned bottom support means which may be vibratable for the purpose of settling a charge as it is filled into the bag, as will be set forth below. A bag filling spout is provided which is of tubular configuration substantially vertically disposed and positioned above both the bag filling station and such belts for vertical reciprocative movement toward and away from a bag in such bag filling station. The bag filling spout is of elongated horizontal cross-section having a major axis which extends in the direction of the aforementioned selected path in such a way that it can be easily inserted into the flat bag mouth therebeneath with relatively little distention of such mouth. The extremity or mouth of the filling spout is suitably curved and tapered somewhat in the nature of a clam shell or duck bill in order to facilitate the insertion thereof into the bag mouth. The latter is preliminarily partially opened by suitable means preparatory for the insertion of the filling spout. Thus an empty open mouth bag is initially held in a substantially upright position and the top region thereof is fed in between said endless belts, the latter moving the bag to the bag filling station and there being arrested for the bag filling, the bag mouth then being preliminarily opened whereupon the bag spout is inserted. Such insertion of the bag spout, of course, spreads the bag mouth and the adjacent runs or portion of the endless belts. Such bag mouth and adjacent portions of the belt are permitted to spread by virtue of the resilient mounting of certain of the belt mounting pulleys as aforementioned. In addition to the aforementioned pulleys for mounting the endless belts, suitable means, such as additional pulleys, are provided adjacent the bag spout path for insuring that the bag mouth is urged closely against the tapered mouth of the filling spout during insertion and withdrawal thereof and, of course, during the filling of the charge into the bag through the spout. Such means comprise, in the form shown, a first pair of pulleys which respectively engage the outer surfaces of the opposite inner runs of the belts near the leading region of the bag top, and a second pair of pulleys similarly disposed but at the trailing region of the bag top, such pairs of pulleys being separated by a distance substantially equal to the length of the filling spout and less than the length of the bag mouth whereby the bag mouth, during the distending thereof by the bag spout, is caused to hug the sides of the bag spout as aforementioned. Thus no leakage path for dust laden air may occur between the bag spout and the bag. The duck bill or clam shell-like filling spout includes at the mouth thereof a pair of pivoted jaws which can be spread apart responsive to the lowering of the spout into the bag mouth whereupon suitable means are actuated for dumping a preweighed charged of material which flows therethrough. Thereafter responsive to a timing control device the endless belts are again actuated simultaneously with the lifting of the bag spout whereby the latter is withdrawn and the portions of the bag mouth engaging same are closely engaged thereby to prevent escape of dust laden air and the bag mouth is thus again tightly closed (as it was before spout insertion) as the bag is contemporaneously urged out of the filling station and into a bag closing station in which are located a closing device, such as the aforementioned sewing machine and closure tape applicator.

Contemporaneous with the departing movement of the filled bag via the exit or downstream extremities of said endless belts, a fresh and empty flat bag is fed in timed relation into the entrance of the bag top conveyor whereby the upper region of the bag is grasped as before described. Suitable timing means, as aforementioned, are provided for controlling in a preselected manner the sequence of the operations above described.

Further and more specific objects, features and advantages of the invention will more fully appear from the detailed description given below taken in connection with the accompanying drawings which form a part of this specification and illustrate, by way of example, preferred embodiments of the invention.

In the drawings:

Fig. 1 is a schematic illustration in perspective of one form of apparatus embodying the invention, certain portions thereof being omitted for purposes of clarity, and such embodiment showing one form of control means for timing the sequence of the several operations thereof;

Fig. 2 is a perspective view of a portion of such apparatus embodying the invention showing the parts in a selected operating position just prior to the insertion of the bag filling spout into a bag;

Fig. 3 is a perspective view of the parts shown in Fig. 2 but with the bag filling spout inserted into a bag mouth;

Fig. 4 is a fragmentary detailed perspective view of a bag saddle or bag chair for supporting a bag in the bag filling station and also showing a retractile bag pusher device;

Fig. 5 is a side elevation of a complete apparatus incorporating the parts shown in Figs. 2-4;

Fig. 6 is an end elevation of the apparatus shown in Fig. 5 as viewed from the discharge end thereof;

Fig. 7 is a sectional view taken substantially on line 7—7 of Fig. 5;

Fig. 8 is a sectional view taken substantially on line 8—8 of Fig. 5;

Fig. 9 is a sectional view taken substantially on line 9—9 of Fig. 8;

Fig. 10 is a plan view of a portion of a linkage employed in moving the aforementioned endless belts;

Fig. 11 is a top plan view, partly in section and with parts broken away, of the novel bag top conveyor portion of the apparatus for holding a bag top in a filling station with its mouth resiliently spreadable for the insertion of the bag filling spout;

Fig. 12 is a fragmentary view on an enlarged scale of a part of the apparatus shown in Fig. 11, including a bag spout inserted into a bag mouth so resiliently held by the apparatus shown in Fig. 11;

Fig. 13 is a fragmentary vertical sectional view taken substantially along line 13—13 of Fig. 11;

Fig. 14 is an end elevation, partly in section and with parts broken away, of the bag filling spout means including the automatic device for opening same, such figure showing the bag spout prior to entrance into a preliminarily opened bag mouth;

Fig. 15 is an end elevation, also partly in section and with parts broken away, of the bag filling spout shown in Fig. 14 after insertion thereof into the bag mouth;

Fig. 16 is a side elevation of the bag filling spout together with the coacting preliminary bag mouth opening device and the endless belt bag top conveyor;

Figs. 17 and 18 are respectively fragmentary side and top elevations of a preliminary bag mouth opening device;

Fig. 19 is a perspective view of the preliminary bag mouth opening means shown in Fig. 18;

Fig. 20 is a perspective view of the righthand portion of the apparatus shown in Fig. 5 with particular reference to the bag magazine and the device for receiving the empty bags one at a time therefrom for movement to the bag filling station; and Fig. 21 is a fragmentary side elevation of a portion of the device for discharging empty bags from such bag magazine.

Referring to the drawings in greater detail, the operation of the apparatus will be described generally with particular reference to the embodiment of Fig. 1 after which the various parts of the apparatus will be described in greater detail together with a modification of the embodiment of Fig. 1.

In Fig. 1, a group 30 of flat empty bags are placed in substantially upright position, as is more fully shown in Fig. 20, within a magazine 31 having an inclined floor 32.

From the magazine 31 the bags of group 30 are fed each at a selected time, as will appear more fully hereinafter, consecutively to a bag holder 33. The discharge of such bags from the magazine 31 may be accomplished by a bag discharge device 34 which reciprocatively moves in a selected manner a suction cup 35 (Figs. 1 and 21) thereby lifting each bag when desired above a retaining finger 36 whereupon the vacuum is temporarily interrupted and the bag falls into the holder 33.

The bag holder 33 is in a bag receiving station, as shown in Fig. 1, and is movable to the left, as viewed in this figure, to an empty bag discharge station wherein it releases a bag, such as 37, to a novel bag top conveyor 38 (Figs. 1 and 20), comprising the aforementioned coacting pair of endless belts, between the pressed together adjacent inner runs of which the top portion of the bag is grasped and urged to a bag filling position, occupied by a bag 39 shown in broken lines. Beneath the bag top conveyor 38 is a bag chair 40 which is caused to vibrate during filling of the bag. The aforementioned novel bag top conveyor includes coacting endless belts 41 and 42, the selected pressed together portions of which are movable adjacent one another for grasping the top region of a bag, as above mentioned, with a portion thereof protruding above the level of the belts 41 and 42, and urging same into the bag filling station.

Reverting to the novel bag top conveyor 38 and its endless belts 41 and 42, the former is stretched taut between pulleys 41a, 41b and the latter is similarly stretched between pulleys 42a, 42b. Pulleys 41a and 42a are mounted for rotation about a fixed axis. However, the pulleys 41b and 42b are mounted upon movable axes, all of such axes being vertical or substantially so. However, suitable resilient means (to be described more fully hereinafter) urge the pulleys 41b and 42b to the right, as shown in Fig. 1, thereby placing the belts under tension and also providing same with a yielding characteristic enabling the inner runs of the belts to spread in response to the insertion of a tapered filling spout 43, as is well shown in Fig. 12. In order to insure that the mouth of the bag hugs the sides of the tapered filling spout during the time that it is in engagement therewith, namely, during spout insertion, bag filling and spout withdrawal, pairs of pulleys 41c and 42c are provided for urging together the inner runs of the belts at the leading region of the bag spout (when inserted) and pulleys 41d and 42d are positioned to perform a similar function at the region of the trailing extremity of the filling spout. Such pulleys 41c, 42c and 41d, 42d are preferably mounted for rotation upon fixed axes although it is possible for such pulleys to be mounted whereby the two pulleys of each pair may be resiliently spread apart.

Such inner coacting runs of the belts 41 and 42 are resiliently spreadable by means of the tapered filling spout 43 of duck bill or clam shell-like configuration which is capable of entering the mouth of the bag, spreading same, together with the adjacent inner runs of the belts 41 and 42 preparatory to the dumping of a preweighed charge therethrough into the bag.

A device for preliminarily opening the portions of the mouth of the bag which protrudes above the belts 41 and 42 is provided comprising a spreader 44 which will be described in greater detail in connection with Figs. 16-19. Such spreader, in the form shown, comprises a knife mounted for angular movement upon a fixed axis and which is held in a selected attitude as a bag passes therebeneath whereby, as with a gusseted bag, the knife enters into the leading gusset at the top thereof and slices through the top edge of the inner fold of the gusset which prevents the knife from riding out of the center path of the bag and insures that after such slicing through it will be then between the two center plies of a multi-ply bag. The knife is provided with spreader wings at its outer extremity for spreading the mouth of the bag to facilitate the insertion of the spout 43.

After such preliminary opening of the bag mouth, the tapered filling spout 43 is inserted and the spreading of the bag mouth is accommodated by the yielding inner runs of the belts 41 and 42, such inner runs being resiliently yielding, as aforementioned, by virtue of a resilient mounting of certain of the pulleys over which the belts move rotatably as will appear more fully hereinafter. Responsive to insertion of the spout 43 a selected distance into the bag mouth, the jaws of such spout, which are normally closed, automatically open to permit the passage of a preweighed charge which is called or dumped at a selected time, for example, at such a time that at least the leading portion thereof reaches the bag spout when it is fully inserted.

After the charge is in the bag, the bag spout is lifted by suitable means to appear hereinafter. The endless belts 41 and 42 are contemporaneously actuated to move the filled bag out of the filling station and to a sewing machine 45 which sews the bag mouth closed, usually applying closure tape over the closure prior to the sewing thereof. A suitable bag conveyor 46 is provided for supporting and moving the bottoms of the filled bags, which are discharged from the vibrating chair 40, and urging same beneath the sewing machine 45.

A suitable charge preweighing device 46a, for example, such as one shown in copending U. S. patent application Serial No. 425,828 of William R. Peterson, may be employed for preweighing the successive charges.

Suitable power and timing means may be employed for controlling the sequence of operations of the apparatus shown in Fig. 1. Such means will now be described. The bag holder 33 comprises a pair of parallel upright plates 47 and 48 which are mounted for reciprocative movement in the direction of the arrow 49 along a selected path from the bag receiving station, as shown in Fig. 1, to an empty bag discharge station. Master drive means for the bag holder are provided comprising a main or master power cylinder 50 which is constructed and arranged for so moving the bag holder reciprocatively from said bag receiving to said bag discharge station and thence back to the bag receiving station. Such master power cylinder 50 includes a piston 51 having a piston rod 52, the latter being drivably connected to the movably mounted bag holder plates 47 and 48. A trough or bag chair 53 is stationarily mounted beneath the plates 47 and 48 for supporting the bottom portions of the bag therein and guiding same into the vibrating bag chair 40. Suitable control means are provided for the master power cylinder, including a primary power control element 54 and a timer 55. Element 54 in the form shown comprises a valve. The master power cylinder 50 is suitably of the pneumatic or air actuated type, to the control valve 54 of which air under pressure is directed via a conduit 56 and from which the actuating medium is selectively directed either to the left or right extremity of the cylinder by means of conduits 57 and 58 respectively.

The means for actuating the endless belts 41 and 42 comprises an operative interconnection between such belts and the piston 52 as follows:

A rack 59 is drivably connected to the piston 52 and actuates a pinion 60, the torque of which is communicated to the pulleys which mount the belts 41 and 42 by a suitable operative interconnection including a ratchet 61 and a pawl 62 whereby the belts 41 and 42 are drivable only in one direction, namely, in such a manner that the inner runs thereof both move to the left (Fig. 1).

The means for releasing a fresh empty flat bag from magazine 31, in the form shown, comprises, as aforementioned, discharge means 34 and 35 which are actuated by means of a microswitch 63 which is positioned in the path of the piston 52 in such a way that the switch 63 is actuated responsive to a full return of the piston 52 to its retracted position, as shown in Fig. 1.

The initiation of the working strokes of the apparatus is under the influence of the timer 55 and the control valve 54 through the intermediary of a microswitch 64 which is actuated by a cam element 65 secured to the piston 52. Thus upon the full retraction of the piston 52 to its righthand position, as shown in Fig. 1, the timer 55 is actuated and will delay the directing of fluid under pressure to the righthand chamber of the cylinder 50, at least until after actuation of the bag discharge device 34 and the falling of a bag 37 into the holder 33. Thereafter the time, by previous adjustment, may cause additional delay in the actuation of the main power cylinder 50 while a preweighed charge falls through the spout 43 into the bag 39, providing such additional delay is required. After the expiration of such time interval as set upon the timer 55, the latter actuates the control valve 54 and directs air under pressure through the conduit 58 and into the righthand chamber of the cylinder 50 thereby urging piston 51 to the left (Fig. 1) and simultaneously moving the bag 37 towards the bag filling station, and further via the rack and pinion 59, 60 and the ratchet and pawl 61, 62 actuating the endless belts 41, 42 whereupon the upper portion of the bag 37 is received between the belts and moved to said bag filling station. Simultaneously and commencing with such movement of the piston 51, a bag pusher 66 is actuated for cooperating with belts 41, 42 to urge the filled bag 39 out of the bag filling station and to the left (Fig. 1), and thence to the tape applicator (not shown in Fig. 1) and sewing machine 45, the bag bottom being urged onto the conveyor 46. The latter conveyor 46 may be divided down the center thereof, as at 46b, for the purpose of accommodating the downwardly protruding bottom closure of the bag. The bag pusher 66 urges the bag to the left (Fig. 1) at the same speed as the endless belts 41, 42. Immediately upon the moving of the fresh and empty bag into the bag filling station, the bag pusher 66 and the bag holder 33 are returned to their righthand or retracted position shown in Fig. 1 by means of the master power cylinder 50. In order to prevent the bag pusher 66, during its return stroke, from colliding with the empty bag now in the bag filling station, such pusher is collapsible or retractile, as will be shown and described below in connection with Fig. 8.

Reverting to the power and timing means for controlling the operation of the apparatus, as shown in Fig. 1, during the initial portion of the leftward stroke of the piston rod 52 the bag spout 43 is raised by means of a power cylinder 67 having a control valve 68 under the influence of a first microswitch 69 which is actuated by a cam element 70 upon the piston rod 52. Thus substantially simultaneously with the commencement of the movement of the endless belts 41 and 42, the tapered filling spout 43 is raised, the endless belts causing the sides of the bag mouth to hug tightly thereagainst during such withdrawal by virtue of the resilient mounting of selected of the belt pulleys and also by virtue of other means for stretching said belts as will appear below. Thus the filled bag is moved out of the filling station to make way for the oncoming empty bag.

The aforementioned cam element 65, shortly before the piston rod 52 reaches the leftward extremity of its motion (Fig. 1), initiates the downward movement of the filling spout 43 by coacting with a microswitch 71 positioned at a selected point in the path of such cam element 65. The microswitch 71 being operatively connected to the valve 68, reverses the flow of its actuating medium, preferably air, and moves the spout downwardly for the filling of the bag. The spout remains in such downward position until actuation of the microswitch 69 by the next leftward motion (Fig. 1) of cam element 70, as aforementioned. However, the means for raising the filling spout, within the purview of the invention, might be rearranged to be actuated at any time after the full charge has been filled into the bag and before such leftward movement of cam element 70.

The means for initiating the return stroke of the piston 51 and hence the rod 52 comprises a microswitch 72 which at the end of the leftward stroke of the piston coacts with said cam element 65 to actuate again the valve 54 thereby to urge the piston 51 to the right towards its initial position, as shown in Fig. 1, the cycle being reinitiated as aforementioned in response to the cam element 65 reactuating the microswitch 64 and hence commencing again the operation of the timer 55 which delays the reactuation of the valve 54 for a selected period.

Reverting to the means for calling or dumping the preweighed charge, any suitable device can be provided for coacting with the charge preweighing device for this purpose. Such latter device 46a is provided with a scale dump bucket 73 having dump gates 74 and 75 which are adapted normally to be closed, the weight of which urges same toward a closed and locked condition, but which, upon tripping of a suitable lock, swing open to permit the charge to be dumped. Thereafter they close under the action of gravity. The closing of such gates will initiate the preweighing of the next charge of material and the placing of same in the bucket 73. In the form shown, a gate dumping device 76 is operatively connected to a microswitch 77, the latter being positioned for actuation by a finger 78 upon the vertically reciprocable filling spout 43. The mounting of the microswitch 77 may be adjusted thereby to call or to dump the preweighed charge in the manner most expeditiously to move same into the bag in the filling station. For example, the microswitch 77 may be positioned whereby it is tripped to dump the charge of preweighed material so that by the time the spout has penetrated a selected amount into the bag mouth, the leading portion of the dump charge is passing through the spout.

The bag support 40 is preferably continuously vibrated by means of a motor 79 operatively connected to an eccentric 80 which engages such saddle 40, the latter being mounted to accommodate such vibrating movement as upon flexible leaf springs. The endless conveyor 46 also is preferably continuously rotated by means of a motor 81 operatively connected thereto.

Referring now to Figs. 2, 3 and 4, there will now be described in somewhat greater detail the bag holder 33 for supporting a single empty bag, the bag top conveyor 38, the bag filling spout 43 and the sewer 45. The bag holder 33, as described in Fig. 1, consists of parallel plates 47 and 48. However, in Fig. 2 only the plate 47 is shown for the purpose of indicating the position of an adjustable palm 82 interposed therebetween for engaging and pushing the rear vertical edge of the bag in response to movement of the holder. The palm 82 is provided with brackets 83 and 84 having suitable slots therein to facilitate the adjustment of the palm along the path of motion and for the purpose of accommodating bags of varying widths. The plate 47 is mounted for movement in the direction of the arrow 49 (Fig. 1) upon the horizontal rails 85 and 86 by means of suitable flanged wheels, such as 87 and 88 (Fig. 3), the latter pair of wheels being mounted at the trailing extremity of a plate 47a secured to 47 and a similar pair of wheels 89, 90 (Figs. 2 and 3) being analogously located at the leading portion of such plate 47a.

The trough-like stationary bag saddle 53 is rigidly secured to a stationary bracket and can be adjusted upwardly or downwardly by adjustment screw 55 which passes through a slot 56 formed in an arm 53a secured to the saddle 53.

The trough-like saddle 53 is in alignment with the bag saddle 40, the latter having a flared entrance region to insure that the bottom portion of the oncoming bag enters between the parallel plates 40a and 40b thereof, as is well shown in Figs. 2 and 4, it being understood, of course, that as the bag is filled and under the influence of the settling motion of the cam 80, the bag bottom will rise somewhat, as shown in Fig. 4, the bottom closure tape nevertheless remaining between the plates 40a, 40b.

The saddle 40 also is adjustable in a vertical direction to accommodate bags of varying lengths as is the conveyor 46.

Reverting to Fig. 2, the resilient mounting means for the pulleys 41b and 42b is well illustrated including springs 91 and 92 which respectively urge the pulleys 41b and 42b to the right, as viewed in Fig. 2, thereby placing the endless belts 41 and 42 resiliently under tension.

Referring now to Figs. 5 and 7, it will be seen that the movable filling spout 43 is coaxial with a fixed conduit portion 93 which in turn is in communication with a bin 94 thereabove, the latter containing the preweighing device 46a (Fig. 1). At the lower portion of the conduit 93 is the aforementioned vertically reciprocative filling spout 43, the upper portion 95 of which embraces conduit 93. Filling spout 43 is provided with a pair of jaws or bill portions 96 and 97 (Fig. 7) which, as aforementioned, when closed are generally of clam shell or duck bill-like configuration and are tapered for easy entrance into the mouth of the bag in the filling station. In general, the conformation of the filling spout is of elongated horizontal cross-sectional shape, as is well shown in Figs. 12, 14 and 15, the major axis of such cross-section being substantially greater than the minor axis and such major axis extending in the direction of the selected path of travel of the bags from the bag receiving station to the bag filling station and thence to the bag sewing station. The vertical transverse cross-sectional conformation of the duck bill-like filling spout is also tapered in order to facilitate the entry into the bag spout. Each of the jaws 96 and 97 of the duck bill-like spout 43 are angularly shiftable within preselected limits about horizontal pivot shafts 96a, 97a, respectively.

As is well shown in Figs. 7, 14 and 15, the jaws 96 and 97 of the bag spout are provided with actuating arms 98 and 99, respectively, the weight of such jaws 96 and 97 normally holding same closed, together with the coaction of the weight of the arms 98 and 99, that is, gravity tends to hold same closed. However, when the jaws are urged to their lowermost position, as shown in Fig. 7, rollers 100 and 101 respectively mounted upon the extremities of the arms 98 and 99 engage cam surfaces 102 and 103, respectively, thereby to spread open the jaws of the filling spout, as is well shown in Figs. 7 and 15, permitting free passage of a charge which is dumped from the preweighing apparatus 46a (Fig. 1).

Reverting to Fig. 5, there is shown a roll 104 of closure tape which, as a web 104a, is fed to a tape applicator 105 of conventional design. The latter includes a tape guide 106 for guiding the tape over an end roller 107 and thence to a tape binder or foldover means 108 which causes the tape to be folded over the now closed mouth of the filled bag just prior to its reaching the sewing head 45. Suitable conventional support means is provided for the plurality of spools of thread 109 for the sewer 45. As shown in Fig. 6, an electric motor 110 is provided for driving the sewing machine 45 intermittently as demanded by a control switch 111, the latter being under the influence of a finger 112 which, through the intermediary of a lever 113, communicates to the switch 111 a thrust indicating the presence of a bag and hence the need for the operation of the sewing machine 45. Thus the motor 110 may operate intermittently under the influence of the switch 111.

Reverting again to Fig. 6, the operative interconnection between the conveyor motor 81 and the endless conveyor 46 is shown in more detail as compared to Fig. 1. Such operative interconnection includes a reduction gear 114 which is driven by the motor 81 by means of a suitable belt or pulley 115, the output of the reduction gear 114 being drivably connected to the shaft of one of the pulleys which support the conveyor 46 by any suitable means, such as a gear train generally shown at 116.

Referring now to Fig. 7, the operative interconnection between the settler motor 79 and the bag saddle 40 is well shown and comprises the following:

The bag chair 40, which is continually vibrated, is held resiliently by a plurality of leaf springs 117 and 118, one extremity of each of which is rigidly secured to the frame of the filling machine and the other extremity to the saddle 40. The leaf springs 117 and 118 are so disposed that a finger 119 rigidly secured to the saddle 40 rests upon the aforementioned eccentric 80 (Fig. 1). The eccentric 80 is operatively connected to the settler motor 79 by any suitable means, such as a shaft 120, journaled for rotation on a fixed axis and drivably connected to the motor by means of a belt 121 which passes over suitable pulleys respectively upon the shaft of motor 79 and on the shaft 120.

In lieu of the pneumatic piston type of device for raising and lowering the filling spout 43, as shown and described in Fig. 1, there may be employed a mechanical device to accomplish the same purpose, such device being shown in detail in Figs. 7, 8 and 9 and comprising in general a lever device which is angularly shifted in response to the movement of a cam to move the filling spout 43 vertically as required.

Referring particularly to Figs. 7 and 9, such a movable cam is shown at 122 and is rigidly secured to the movable plates 47 and 47a for reciprocative linear movement therewith in accordance with the movement of the master power cylinder 50. The latter, in the form shown in Figs. 7, 8 and 9, operates as before with the exception of the substitution of the mechanical device for raising and lowering the filling spout. The cam 122 of Fig. 9 is positioned for coacting with a bell crank lever 123 which is mounted for angular movement about a fixed pivot 124 and is provided with a roller 125 for coacting with the actuating surface of the cam 122, the latter having a depression therein at 122a into which the roller 125 can ride for the purpose of lowering the filling spout. The bell crank lever 123 is operatively connected to the filling spout 43 by means of a pin 125a (Fig. 9) which rides within a horizontal slot 126 formed in a yoke member 127 to which are secured a pair of vertical rods 128 and 129 which are journaled for reciprocative movement in a vertical direction and to the upper ends of which is secured the filling spout 43, as is well shown in Fig. 7.

The filling spout 43 may be secured to vertical rods 128 and 129 by any suitable means, such as a horizontally adjustable supporting arm 130 which, by means of an adjustment screw 131, can be vertically moved with respect to the rods thereby to adjust the time of the opening of the jaws of the filling spout.

In the operation of the filling spout raising and lowering device of Figs. 7, 8 and 9, the cam 122 is so arranged that the filling spout is lowered when the main power cylinder 50 is in its fully retracted position, as viewed in Fig. 9. Thus, in this form, the empty bag is thrust into the filling station in a manner similar to that described in Fig. 1 and as it reaches such station the filling spout is in a raised position. Such spout, however, is not lowered until the bag support 33 is fully retracted to its righthand extremity of motion whereupon the cam roller 125 rides down into the valley 122a of the cam 122 thus lowering the filling spout. Such spout is, of course, raised thereafter from the filled bag in response to the actuation of the main power cylinder which moves cam 122 to the left from its position shown in Fig. 9. Such raising of the spout occurs contemporaneously with the moving of the endless belts 41 and 42, the spout withdrawing while the endless belts contract to their initial unspread condition and in the process hold the mouth of the bag snugly against such withdrawing filling spout.

Thus the filling spout raising and lowering device of Fig. 1 is somewhat different in operation as compared to that of Figs. 7, 8 and 9 inasmuch as the filling spout of Fig. 1, although raised at the outset of the motion of the master power cylinder piston 51, is lowered in response to a bag reaching the filling station signaled by, for example, such master power cylinder piston reaching the lefthand extremity of its motion, this occurring by means of the microswitch 71 and the power cylinder 67. Thus the bag filling spout enters the bag in the embodiment of Fig. 1 in advance of the time that it enters the bag in the cycle of operation of the Fig. 9 linkage.

Referring particularly to Figs. 8 and 9, the rack and pinion device 59 and 60 is well shown and the ratchet and pawl device 61, 62 is shown in greater detail in Fig. 10.

The rack 59, as shown in Fig. 8, engages the pinion 60, the latter being rigidly secured to and rotating with a shaft 131 which actuates the pawl 62 by rotating the lever 62a to which it is secured in a conventional way. The lever 62a, of course, is secured to the shaft 131. The ratchet 61 communicates torque to a suitable sprocket wheel which in turn actuates an endless sprocket chain 132 and thus turns a sprocket wheel 133 upon a shaft 134, the latter being drivably connected to the shafts upon which at least one of the pulleys of such belts 41 and 42 are mounted. Such a connection is schematically shown in Fig. 2 wherein the sprocket wheel 133 drives two meshing gears 135 and 136 which are respectively drivably connected to the pulleys 41a and 42a about which pass the belts 41 and 42, respectively, thereby simultaneously driving such endless belts.

The filled bag pusher 66 will now be described with particular reference to Figs. 2, 6 and 8.

As aforementioned, the bag pusher 66 should be so conformed that it is able to push a filled bag out of the filling station and onto the conveyor 46 and hence move the top of the bag into the sewing machine 45. Thereafter the bag pusher 66 should be promptly retractable along with the piston 51 in view of the fact that the bag pusher 66 is drivably connected to the piston rod of the master power cylinder. As is well shown in Fig. 8, such pusher is secured to the plate 47 and hence is movable by the master power cylinder. One advantageous form of such bag pusher 66 comprises a plurality of spaced fingers, alternate ones 66a of which are directed to the left of a centerline 66b (Fig. 2), the other fingers 66c being directed to the right of such centerline. The alternative fingers 66a are separated by intervals which will accommodate the fingers 66c when the latter are moved angularly in response to suitable cam action or any other impulse thereby to retract and move same out of the way to prevent same from colliding with the empty bag which has been placed in the bag filling position. Such collision would normally occur on the return stroke of the master power cylinder in the absence of such retraction of the fingers 66c.

Referring to Fig. 8, the fingers 66c are secured to an angularly shiftable arm 137 which is normally in the position shown in full lines in Fig. 8 but which, under the influence of a cam device 138, can be shifted in a clockwise direction to the position shown in broken lines in this figure. Such cam device 138 comprises a lever 139 pivotally mounted at 140 and having an arm 139a which is positioned for engaging a fixed limit-stop 141 at the retracted position of the master power cylinder, thereby to urge the arm 137 in a counterclockwise direction and to move the fingers 66c to the position shown in solid lines where it can be held by a toggle spring 142 which is positioned for toggle action with respect to a fixed axis 143 about which the arm 137 is pivotally mounted. A second arm 139b is pivotally associated with the arm 137 by means of a link 144. Consequently when the power cylinder moves to its extended or lefthand position, the arm 139a is positioned for striking another limit-stop 145 thereby to retract the fingers 66b to the position shown in broken lines in Fig. 8 and in which position thy will be so held by the toggle spring 142 which springs to a position above (Fig. 8) the axis of the pivot 143 thereby to hold same in a toggle action until returned as a result of coaction of the arm 139a with the limit-stop 141.

Referring now to Figs. 1 and 11–19, inclusive, there will now be described in further detail the cooperation of the preliminary bag mouth opening means with the bag spout, and also the bag top conveyor means which holds the mouth of the bag in the bag filling station.

Referring particularly to Fig. 16, the preliminary bag mouth opening knife 44 described above in connection with Fig. 1 is mounted for angular movement about a pivot 146 which, in the form shown, is fixed although the invention is not necessarily limited to such pivot being fixed. The preliminary opening knife 44 is urged in a counterclockwise direction by means of a spring 147 which engages an arm portion 44a comprising the trailing portion thereof as viewed in Fig. 16. The preliminary opening knife thus is resiliently urged against a suitable limit-stop (not shown) so that it is normally in the position shown in Fig. 16 although it may shift slightly in a clockwise direction against the pressure of the spring 147 as it rides into an oncoming gusset of a gusseted bag and slices through the upper portion of the inner fold of the gusset of the bag, as is well shown in Fig. 19. The knife 44 is provided with mouth spreader wings 44b and 44c (Fig. 18), the function of which has been mentioned above and is well illustrated in Fig. 19 and which spread apart the two central inner plies of the flat bag above the two endless belts thereby preparing the mouth for the insertion of the filling spout 43.

Referring again to Figs. 16–19, inclusive, a bag, such as 37, is fed between the inner runs of the endless belts 41 and 42 and is moved beneath the spreader knife 44 to the left (Fig. 16), the belts 41 and 42 being so disposed centrally beneath the knife 44 that the latter enters between the leading gusset folds (Fig. 19) and the sharpened edge thereof engages the top portion of the inner fold of the gusset at 37a (Fig. 19), and cuts through same. The spreader knife thus is accurately centered with respect to the mouth of the bag and rides down between the two inner plies thereof thereby spreading the mouth by means of the wings 44b, 44c to the position well shown in Fig. 11.

The bag 37, during the relative movement thereof with respect to the knife 44, thus advances to the bag filling station and is prepared for the insertion of the bag filling spout 43. Such bag filling spout preferably is not inserted into the preliminarily opened mouth of the bag until it has reached the bag filling station. However, by means of the apparatus herein described it is possible at least to start the insertion of the leading edge of the mouth of the bag spout 43 somewhat before the time that such bag mouth reaches its final position, such final position being shown in Fig. 11 in plan view.

Springs 91, 92 comprising primary belt tensioning means, should be of selected strength or force characteristics to insure that they do not cause the belts to press too strongly or too weakly against the bag spout during its insertion and withdrawal, but are adequate to urge the bag mouth snugly against the bag spout during such filling and withdrawal without causing the bag mouth to slip by any appreciable amount relative to the belts. In the absence of such strength characteristics, the filling spout may dislodge the bag mouth from a desired position relative to the belts, for example, it may force the center of the bag mouth down by an excessive amount during spout insertion thereby preventing proper sewing or closing. A set of springs of such strength characteristics may not be of adequate force to cause the belts to grip the bag strongly enough when the spout is disengaged therefrom. Consequently I have found it desirable, but not mandatory, to employ additional and stronger or secondary means for tensioning the belts when the spout is out of the bag.

An example of such means is shown in Figs. 11 and 16 including a pair of cam controlled levers 148 and 149 which are rigidly secured to the pivot shaft 146 (Fig. 16). Such levers, under the influence of a cam, respectively urge to the right (Fig. 11) the pulleys 41b and 42b through the intermediary of axially shiftable rods 150 and 151, respectively, which in turn are connected to the bearings of the shafts of said pulleys. The rods 150 and 151 are normally in a horizontal attitude, as shown in Figs. 11 and 16 and are connected at their righthand extremities to such bearings of the shafts of pulleys 41b and 42b. The lefthand extremities thereof are positioned for coaction with the levers 148 and 149. An upper arm 149a of one of such levers 149 is shown in Fig. 16 positioned for coaction with a tension control cam 152 which is secured to the spout 43 and which is designed to urge the rods 150 and 151 to the right thereby to increase belt tension in response to the movement of the filling spout 43 out of the bag mouth and conversely to lessen such tension in response to the lowering of such spout 43 beyond a selected level. Thus, in response to the lowering of the spout a cam roller 153 secured to the upper end of the lever arm 149a rides downwardly upon a slope 152a of the cam 152 and thuse shifts the levers 148 and 149 clockwise (Fig. 16) and releases the positive lever pressure upon the shafts of the pulleys 41b and 42b. It will be noted from Fig. 11 that the aforementioned springs 91, 92 preferably are of a helical or coil type and are respectively coiled about the rods 150 and 151 and are respectively interposed between bracket pairs 91a, 91b and 92a, 92b. The brackets 91a, 92a are stationarily mounted from the frame of the apparatus and the brackets 91b and 92b are movably mounted, being connected to the shafts of the pulleys 41b, 42b (Fig. 16).

In order to insure that the top of each bag is guided accurately into the path of the preliminary opener 44, a bag top guide device is provided, as shown in Fig. 13, comprising opposed upstanding fixed bag mouth guide members 154 and 155 which are stationarily mounted and preferably extend for a distance equal to at least the dimension between the axes of the pulleys 41b and 41d. The length and conformation of the vertical guides 154 and 155 is well shown in Fig. 11.

After the bag, such as 37, has reached the bag filling station, as shown in Figs. 11 and 12, the filling spout 43 is lowered, the leading edge enters the preliminarily opened mouth of the bag accomplished by the spreader knife 44 and spreads the bag mouth, together with the adjacent portions of the inner runs of the belts 41, 42, as well shown in Fig. 12. The coacting pairs of pulleys 41c, 42c grasp the upper leading portion of the bag mouth adjacent the trailing region of the leading gusset and hold same firmly therebetween and the pulleys 41d, 42d perform an analogous function with respect to the trailing portion of the bag mouth by urging the upper leading portion of the rear gusset together. It is understood, of course, that the pulleys 41c, 42c and 41d, 42d act upon the bag mouth at a region somewhat below the top edge thereof, as is well shown in Fig. 16. Thus such pulleys insure that the mouth of the bag is snugly urged against the tapered filling spout as it moves in and out thereof. And thus the distance between such two pairs of pulleys is less than the bag width by a selected amount to insure that the leading and trailing regions of such bag mouth are firmly grasped. Further, there is no opportunity for a leakage path to occur between the bag mouth and the tapered mouth of the filling spout.

In operation, the bag holder 33 is initially in its retracted position to the right, as viewed in Figs. 1 and 20. Such bag holder 33 initially is empty and prepared to receive an empty flat bag. Contemporaneously a bag is in the bag filling station having received a charge of material from the bag filling means. The bag magazine discharge device 34 is actuated by suitable means, such as the microswitch 63 (Fig. 1), and a new empty bag is lifted out of magazine 31 and falls between the vertically spaced bag support plates 47 and 48. The bag comes to rest with the bottom closure thereof resting in the bottom of the trough or bag saddle 53. The timer 55 (Fig. 1) is in operation, having been actuated by the microswitch 64 and thus after the elapse of a selected time interval, which allows for the dropping of the fresh bag and the dropping of the charge into the bag in the filling station, will actuate the master power cylinder 50 and cause same to move to the left, as viewed in Figs. 1, 8 and 9. The mechanical bag spout raising device in Figs. 8 and 9 thereupon is immediately actuated by means of the coaction of the cam 122 and bell crank lever 123 due to the riding of the cam follower 125 out of the valley 122a and up upon the horizontal flat portion of the cam 123. In distinction thereto, the bag spout in the embodiment of Fig. 1 is raised in the manner described in connection with such figure. Consequently the simultaneously adjacent inner runs of the endless belts 41, 42 are moved to the left (Figs. 1, 2, 3, 5, 8, 9, 11, 12 and 16). Contemporaneous with the movement of such endless belts the filling spout is withdrawn, such spout, of course, clearing the bag mouth prior to the trailing edge of the bag mouth colliding with the trailing edge of the filling spout. By virtue of the duck bill or clam shell-like configuration of the filling spout, the spout can be raised easily without the danger of engaging the rear fold of the bag. After the tapered mouth of the bag spout is withdrawn from the bag, the levers 148 and 149 engage the rods 150 and 151 due to the roller 153 riding up the slope 152a of the cam 152 and the endless belt pulleys 41b, 42b are thus positively thrust to the right, as viewed in Fig. 11. Prior thereto the springs 150 and 151 urge the mouth of the bag against the mouth of the filling spout as the latter is withdrawn. It will be seen from Figs. 14 and 15 that the pivoted jaws 96, 97 of such mouth immediately commence shifting angularly toward a closed position when the upward movement of the filling spout is initiated, such jaws moving promptly to a closed position whereupon the adjacent inner runs of the endless belts 41, 42 compel the inner surfaces of the bag mouth to follow the tapered configuration of the mouth of the bag spout as it is withdrawn thereby preventing leakage of dust laden air from around the spout.

Thus the filled bag is disengaged from the bag filling device and is advanced by the endless belts 41, 42 out of the bag filling station to make way for the aforementioned oncoming empty bag, the top margin of which is urged in between the guides 154, 155 (Fig. 13) and simultaneously the leading edges of the bag top are grasped between the adjacent inner runs of such endless belts and advanced toward the spreader knife 44, the bag top being accurately guided with respect to such knife by such vertical guides 154, 155 whereby the knife enters the leading bag gusset fold, as in Fig. 16, the portion of the bag mouth protruding above the endless belts being thus spreadable by the knife and its spreader wings 44b, 44c. The lower edge of the knife 44 is, of course, the cutting edge and cuts through the upper inner portion of the gusset fold (Figs. 16 and 17) and thence moves between the two center plies of the bag thereby preliminarily opening same in preparation for the insertion of the bag filling spout.

With respect to the bag spout control linkage of Figs. 8 and 9, the bag spout is not lowered until the full retraction of the main power cylinder 50 to its righthand limit of motion although it is within the purview of the invention to employ suitable means for mechanically lowering the filling spout analogous to the hydraulic means therefor described in connection with Fig. 1. In fact the time of lowering of the bag spout can be adjusted as desired to aid rapid filling. Nevertheless in such linkage of Figs. 8 and 9, the spout remains in the raised position until the piston 51 is retracted to its righthand limit of motion whereupon the spout is lowered and the above-described operation of the cam and lever means 152, 149 occurs thereby releasing the positive unyielding mechanical thrust upon the pulleys 41b, 42b and permitting the springs 91, 92 resiliently to govern the tension of the belts 41 and 42 thereby preparing the inner runs of the belt for suitable spreading in response to the insertion of the tapered mouth of the bag spout as above set forth. As the bag spout 43 moves downwardly, the charge of preweighed material is dumped from the preweighing device in the manner described above in connection with Fig. 1.

In order to increase the production rate of the apparatus, the time of the various acts occurring herein can be selected with high accuracy and can be accurately controlled.

When the endless belts 41, 42 discharge the filled bag they direct the top portion thereof to the tape applicator and sewing machine, the bottom being urged onto the conveyor 46 and moved at the same speed as the sewing machine. As soon as the advancing means (usually feed dogs—not shown) of the sewing machine grasp the upper margin of the bag for sewing, it may be desirable to provide means for compelling the endless belts immediately to relinquish their grasp upon the trailing regions of the bag mouth, for example, by providing suitable timed cam means (not shown) for separating slightly the two pulleys 41a, 42a whereby the sewing machine can, without hindrance from the belts, move the bag top. The need for such separating means, however, does not occur if endless belts 41, 42 advance the bag top at the same speed as the sewing machine.

There is thus provided a novel and automatic filling and closing machine for bags of the open mouth type, which machine is capable of a high production rate of extremely accurately preweighed charges of material, for example, one hundred pounds of sugar weighed within extremely narrow error limits. The apparatus does not require the full attention of one operator but only intermittent attention for the purpose of filling the bag magazine, the machine otherwise operating automatically. Further the bag filling aspects of the invention provide an entirely closed bag mouth during filling whereby any leakage around the bag mouth is of negligible or insignificant degree and there is no appreciable distortion of the bag by the mouth of the bag filling spout. The filling spout is flattened or streamlined in the direction of the movement of the oncoming and outgoing bags and thus is at all times aligned with the mouth of the bag in the sense that the major axis of the streamlined bag spout extends in the same direction as the major axis of the bag mouth. The distention of the bag mouth during filling is thus kept to a minimum commensurate with insertion of the bag charge, such minimum distention being an appreciable factor in rapid operation of the machine. If desired, a vacuum scarf (not shown) may be mounted around the bag filling spout for the purpose of quickly removing any dust laden air which might by accident escape.

Although the invention has been described with respect to an open mouth type of bag which is closed by a sewn seam, the invention is not limited thereto, it being possible to employ other open mouth type bags, for example those of the so-called pastable-end variety, which, after filling, instead of being sewn closed, can be operated upon by suitable means for closing same including means for spreading same open to form side flaps and end flaps, means for applying paste thereto, such side flaps being thereafter folded one over the other by suitable foldover means. Such pasted-end type of bag closure, of course, can have side flaps and end flaps either of the flush or stepped varieties. Also, other forms of bag closing devices can be employed in lieu of such sewing machine and/or pasted-end type of bag closing device including, for example, devices for folding a plastic tape over the top edge or mouth of the bag, such tape being, for example, of thermoplastic qualities, which can close the bag mouth by heat sealing same, there being perforations along the upper margins of the bag through which the opposite sides of the folded over plastic tape can adhere to one another under the influence of heat.

Although the invention has been shown and described in connection with the filling and closing of a gusseted bag, the apparatus can also fill and close non-gusseted bags in which event the portion of the bag top which protrudes above the endless belts can be preliminarily opened by suction means in order to prepare same for the insertion of the bag spout, such suction means acting upon the opposed outer surfaces of such protruding portion and pulling same apart. Where such means are employed in multi-ply bags, the adjacent faces of the plies intermediate the inner and outer plies must be pasted together in order to insure that the bag mouth is properly opened and to prevent the bag spout from entering between improper plies. Alternatively, other suitable means can be employed for preliminarily opening such upwardly protruding portion of the bag mouth comprising, for example, rollers having substantially radially extending pins mounted on the periphery thereof for penetrating a selected depth into the plies and urging same open. Further a non-gusseted bag may be prepared for preliminary opening by the spreader element 44 by forming in the leading upper corner thereof a small corner gusset into which the spreader element 44 may ride and operate in the manner described in connection with Fig. 19.

Furthermore, suitable means (not shown) are provided for adjusting the position of the engaging adjacent inner runs of the endless belt relative to one another. For example, all of the pulleys associated with belt 41 may be mounted upon stationary axes of rotation and the pulleys of the other belt mounted upon axes of rotation which may move together by virtue of suitable pulley mounting means which can be adjusted as a unit thereby providing easy adjustment of the space between the aforementioned adjacent inner runs of such belts. Also, in addition to such common adjustment of feature of all of the pulleys of the belt 42, namely, pulleys 42a, 42b, 42c and 42d, individual adjustment means, if desired, can be provided for each such pulley for individually adjusting the position thereof toward or away from the belt 41.

It is, of course, understood that the endless belts 41 and 42 can be of any suitable construction, such as rubber reinforced by inner strands of wire or by sprocket chains, preferably having rubber gripper surfaces for the bags, or any equivalent flexible strip or band may be employed.

It is desirable for the leading edge of the bag top to stop at a common reference point defining the maximum point of advance thereof into the bag filling station, thereby insuring that it is properly positioned beneath the bag spout for filling. Thus it is desirable for the leftmost pulleys (Fig. 1) 41a, 42a to rotate upon axes which, during the filling of a bag of a given width, do not move in the direction of the path of the bags. Only the rear pulleys 41b, 42b in the preferred embodiment are shiftable, for example, in the direction of bag motion, to accommodate the expansion and contraction of the belts incidental to bag spout insertion and withdrawal. However, suitable means may be provided for moving all of the pulleys of the endless belts as a unit along the path of bag movement in order to adjust the position thereof relative to the bag filling spout where such adjustment is necessary.

In the form of the invention shown, the sewing head 45 is so positioned with respect to the endless belts that the bag top is about half way sewn closed before the endless belts relinquish same. I have found that, due to this relation, the endless belts insure that the top edges of the bag mouth are urged well up into the tape applicator thereby insuring that such upper edges are not spaced by any appreciable distance from the the undersurface of the fold of the tape. However, should it be desired to space the needle of the sewing head 45 greater than about one bag width from the discharge extremity of the endless belts, I have found it desirable to place between the sewing head and the endless belts an intermediate pair of relatively shorter endless belts which grasp the bag top in a manner similar to belts 41 and 42 and hold same up for insertion into the sewing head. Such intermediate endless belts preferably are continuously driven or, if desired, such intermediate belts can be driven intermittently when required by suitable control means for sensing the presence of an oncoming bag at a desired norm location.

Also, if desired, a metal shield (not shown) can be employed situated slightly in advance of the tape roller 107 for preventing the top leading edge of an oncoming bag, which may be somewhat higher than desired, from colliding with the tape prior to the initiating of the tape movement, such shield being in the form of a somewhat flattened inverted channel member, for example, of flat inverted V cross-section having a suitably flared mouth to receive easily the upper leading edges of an oncoming bag and guiding same well under the moving closure tape just prior to the folding of the tape thereover and the feeding of both the bag top and the closure tape to the sewing means. Such metal shield or guide can prevent the bag top from touching the tape until the sewing machine starts in response to the oncoming bag actuating the aforementioned sewing machine microswitch 111 by the elements 112, 113 (Fig. 6).

What is claimed is:

1. In apparatus for gripping and filling bags of the open mouth type, a pair of bag gripper elements at least one of which is a flexible strip, resilient means for tensioning such flexible strip, said elements being mounted for pressing against one another and hence for grasping therebetween the mouth of a bag and urging same toward a closed condition, a bag filling spout having a tapered mouth, and means for mounting said spout and gripper elements for relative movement whereby said spout can enter the mouth of a bag held between said elements to spread same together with said elements, said resilient tensioning means being yieldable to accommodate such spout.

2. In apparatus for gripping and filling a bag of the open mouth type, a pair of bag gripper elements at least one of which is a strip laterally flexible but substantially resistant to elongation, resilient means for tensioning such flexible strip, said elements being mounted for pressing against one another and hence for grasping therebetween the mouth of a bag and urging same closed, a bag filling spout having a tapered mouth, and means for mounting said spout and elements for relative movement, said spout in response to such relative movement entering the mouth of a bag held between said elements to spread same together with said elements.

3. In apparatus of the class described, a pair of opposed elongated flexible bag gripping strips, said strips being mounted pressing against one another, at least one of said strips having connected thereto means for resiliently putting same under tension thereby urging same into a taut condition, said strips being movably mounted and adapted for grasping therebetween the top margin of an open mouth bag and urging same resiliently toward a closed condition, a bag filling spout, said bag filling spout having a tapered extremity for insertion into the mouth of the bag so resiliently urged to a closed condition, means for mounting said bag gripping strips and bag filling spout for relative movement whereby said spout is so insertable into said bag mouth.

4. In apparatus of the class described, a pair of opposed elongated flexible bag mouth holding strips, each of said strips having connected thereto means for resiliently putting same under tension thereby urging same into a taut condition, said strips being mounted for movement and also mounted for grasping therebetween the top margin of an open mouth bag and urging same toward a closed condition, said bag thereby being movable into a filling station in response to the movement of said strips through a selected distance, a bag filling spout, said bag filling spout having a tapered mouth for insertion into the mouth of the bag so resiliently urged to a closed condition as aforementioned, means for mounting said bag mouth holding strips and bag filling spout for relative movement whereby said spout can be inserted into such bag mouth, the latter and such strips resiliently expanding to accommodate such insertion by virtue of the resilient tensioning of such strips, said bag mouth and strips also resiliently contracting in response to the withdrawal of such bag filling spout, the bag mouth and strips tightly hugging said tapered bag filling spout during insertion and withdrawal, and means for increasing the tension upon said strips responsive to disengagement of said spout from such bag mouth.

5. In apparatus of the class described, a pair of elongated flexible bag gripping elements, said elements being mounted pressing against one another, at least one of said elements having connected thereto means for resiliently placing same under tension thereby urging same into a taut condition, means for mounting said elements for movement and thus for grasping therebetween the top margin of an open mouth bag and urging same toward a closed condition, a bag filling spout having a tapered mouth and positioned for insertion into the mouth of the bag so urged to a closed condition, means for mounting said bag filling spout and elements for relative movement whereby said spout can be inserted into a bag mouth held by said elements, the latter resiliently expanding to accommodate such insertion by virtue of the aforementioned resilient tensioning means, said elements and bag mouth also resiliently contracting in response to the withdrawal of such bag filling spout, the bag mouth tightly hugging said tapered bag filling spout during insertion and withdrawal.

6. In apparatus of the class described, a holder for supporting a single empty bag, such holder being mounted for movement along a selected path from a bag receiving station to a bag discharge station; master drive means for said bag holder constructed and arranged for moving the latter reciprocatively between the bag receiving station and bag discharge station; control means for said master drive means; the control means being actuatable to initiate the movement of the drive means, there being means responsive to movement of the holder to such discharge station to initiate such return to the bag receiving station; a combined bag top conveyor and gripper positioned for receiving an empty bag from said bag holder, grasping the bag along the top thereof a selected distance below the top edge and urging same into a bag filling station, said conveyor including: a pair of endless belts each stretched over belt pulleys, means for mounting said pulleys for normally pressing together the inner runs of said belts against one another thereby to receive a bag fed between such runs tightly to hold and advance same in response to movement of such inner runs in the same direction, means for mounting selected of said pulleys resiliently for movement in a direction normal to their axes of rotation thereby to accommodate a spreading apart of said inner runs responsive to the spreading apart of the mouth of said bag when in the filling station; an operative interconnection between said main drive means and said endless belts effective to drive the latter responsive to movement of said holder from said bag receiving to said bag discharge station; a bag filling spout positioned above said bag filling station and said belts; preliminary bag mouth opening means for preliminarily spreading apart that portion of the bag top which protrudes above such belts thereby preparing the bag mouth for insertion of the bag spout; said filling spout having a tapered mouth for insertion into the bag mouth; means for mounting said filling spout for movement between a raised position above and disengaged from a bag in such filling station and a lowered or filling position inserted in such bag mouth; and power means for raising and lowering said spout in selected timed relation with the movement of empty bags into said bag filling station.

7. In apparatus of the class described, a holder for supporting an empty bag, such holder being mounted for movement along a selected path from a bag receiving station to a bag discharge station; drive means for said bag holder constructed and arranged for moving the latter reciprocatively between such stations; a bag top conveyor positioned for receiving an empty bag from said bag holder, grasping same progressively along the top thereof a selected distance below the top edge and urging same into a bag filling station, said conveyor including: a pair of endless belts, support means for said belts, each belt being stretched taut over its support means, the latter being positioned whereby selected runs of said belts are normally pressed against one another thereby to receive a bag top introduced between such runs tightly to hold and advance same in response to movement of such belt runs in the same direction, said support means including means adapted for movement to accommodate a spreading apart of said runs responsive to the spreading apart of the mouth of said bag when in the filling station; a bag filling spout having a tapered mouth; and means for mounting said filling spout for movement relative to a bag in such filling station.

8. In apparatus of the class described, a bag magazine for containing a plurality of flat empty open mouth type bags in adjacent consecutive face-to-face relation; a holder for supporting a single empty bag in substantially upright position, such holder being positioned for receiving a bag discharged from said bag magazine and also being mounted for movement along a selected path from a bag receiving station to a bag discharge station; bag magazine discharge means operatively associated with said magazine for effecting transfer of a bag from said magazine into said holder; master drive means for said bag holder constructed and arranged for moving the latter reciprocatively between the bag receiving station and bag discharge station; control means for said master drive means including a primary power control element and a timer; the control element being actuatable to initiate the movement of the drive means, there being means responsive to movement of the holder into such discharge station to initiate such return to the bag receiving station; a bag top conveyor positioned for receiving an empty bag from said bag holder, grasping same progressively along the top thereof a selected distance below the top edge and urging same into a bag filling station, said conveyor including: a pair of endless belts each stretched taut over a pair of primary belt pulleys positioned whereby the inner runs of said belts are normally closely adjacent one another thereby tightly to hold a bag therebetween and to advance same in response to movement of said inner belt runs in the same direction, said inner runs extending along said selected path of movement, at least one of said primary pulleys of each pair being mounted for movement in a direction normal to its axis of rotation thereby to accommodate a spreading apart of said inner runs responsive to the spreading apart of the mouth of said bag when in the filling station; an operative interconnection between said main drive means and said endless belts effective to drive the latter responsive to movement of said holder from said bag receiving to said bag discharge station; a bag filling spout positioned above said bag filling station and said belts; preliminary bag mouth opening means positioned along said selected line above said belts, such means comprising a spreader knife mounted for angular movement about a stationary axis and positioned for entering between the leading gusset of a gusseted bag top moved by said endless belts, cutting through the inner gusset fold and thus entering between the two facing inner plies of the bag mouth and spreading same, said filling spout having an elongated horizontal cross-section with a major axis substantially greater than the minor axis thereof, such major axis extending in the direction of said selected path of movement whereby a bag moved to said bag filling station and preliminarily opened by said spreader knife can receive said filling spout responsive to the lowering of the latter, said filling spout having a duck bill-like jaw portions normally closed and of tapered cross-section vertically and transversely thereof to facilitate the entrance of the closed spout into such preliminarily opened bag mouth; means for mounting said filling spout for movement between a raised position above and disengaged from a bag in such filling station and a lowered or filling position inserted in such bag mouth; filling spout moving means for lowering said spout responsive to movement of said master drive means a selected amount; charge preweighing means including a scale dump bucket; means for dumping said bucket responsive to downward movement of said filling spout; means for opening said closed filling spout also responsive to such downward movement thereof; means for actuating said timer and said bag magazine discharge means responsive to return of said empty bag holder to said bag receiving station, such timer delaying the actuation of said primary control element and hence said main drive means for a selected interval at least sufficient to allow a bag to be transferred into said holder from such magazine; means responsive to actuation of said drive means at the outset thereof to actuate in turn said filling spout moving means to raise the spout out of the filled bag in the filling station while contemporaneously moving said endless belts to move such filled bag therefrom to make way for the oncoming empty bag in such holder; bag body pusher means for engaging the body of the filled bag and urging same in the same direction as the bag gripping portions of said endless belts; and bag closing means for receiving from said endless belts the closed bag mouth and securing same in closed condition.

9. In apparatus of the class described, a bag top conveyor positioned for receiving an empty bag of the open mouth type and grasping same progressively along the top thereof a selected distance removed from the edge thereof and conveying same into a bag filling station, said conveyor including: a pair of endless belts mounted with portions thereof adjacent to and engaging one another, means for so mounting such endless belts for movement, such adjacent belt portions extending along a selected path in which such bag filling station is located; a tubular bag filling spout positioned near such belts and in such bag filling station and mounted for movement toward and away from a bag in such station, such bag filling spout having a tapered mouth; means for preliminarily opening that portion of said bag mouth which protrudes beyond said endless belts to enable insertion of said spout therein while so gripped; the insertion of such spout into the mouth of a bag at said filling station causing said mouth and adjacent belt portions to spread apart, the withdrawal of such spout causing the reverse; resilient means connected to such belt mounting means for accommodating said spreading apart and return of said normally adjacent belt portions, whereby the mouth of said bag is gripped during both spout insertion and withdrawal; means for feeding empty bags seriatim in between such adjacent belt portions; and means for controlling movement of said filling spout in timed relation to the movement of said bag feeding means.

10. In apparatus of the class described, a bag top conveyor positioned for receiving an empty bag and grasping same progressively along the top thereof a selected distance below the upper edge of the mouth thereof and conveying same into a bag filling station, said conveyor including: a pair of endless belts mounted with portions thereof engaging one another, means for mounting such engaging belt portion for movement each along a selected path in which such bag filling station is located; a tubular bag filling spout positioned above such bag filling station and mounted for reciprocative movement toward and away from a bag in such station, such bag filling spout being of elongated horizontal cross-section having a major axis extending in the direction of said path, a vertical transverse cross-section thereof normal to such path being tapered to a lip; means for preliminarily opening that portion of said bag mouth gripped by said endless belts to enable insertion of said spout therein while so gripped; and means for supporting selected portions of said engaging belt portions thereby to prevent spreading apart of such portions and including two pairs of belt support elements beneath said spout, one pair beneath the leading edge thereof and the other pair beneath the trailing edge, said pairs thus being separated by less than the length of the upper edge of the bag, each of such pairs of belt support elements being positioned to back-up its respective belt portions therebetween thereby to prevent spreading of such portions at the leading and trailing end portions of a bag therebetween, the lowering of such spout and hence the insertion thereof into the mouth of a bag at said filling station causing said mouth and adjacent belt portions to spread apart, the raising of such spout causing the reverse; resilient means connected to said belt mounting means for accommodating said spreading apart and return of said normally adjacent belt portions, whereby the mouth of said bag is urged against said spout during both spout insertion and withdrawal.

11. In apparatus of the class described, a bag top conveyor positioned for receiving a substantially upright empty bag and grasping same progressively along the top thereof a selected distance below the horizontal upper edge of the mouth thereof and conveying same into a bag filling station, said conveyor including: a pair of endless belts mounted with adjacent aligned portions thereof sufficiently close to one another for gripping a bag therebetween, yieldable belt support means for so mounting such endless belts, such adjacent belt portions extending substantially horizontal along a selected path in which such bag filling station is located; and a tubular bag filling spout positioned above such bag filling station and mounted for movement toward and away from a bag in such station, such bag filling spout having a mouth tapering to a lip which is substantially aligned with said path; the lowering of such spout and hence the insertion thereof into the mouth of a bag at said filling station causing said mouth and adjacent belt portions to spread apart, the raising of such spout causing the reverse; said yieldable belt support means accommodating said spreading apart and return of said normally adjacent belt portions, whereby the mouth of said bag is gripped and urged snugly against said spout during both spout insertion and withdrawal.

12. In an open mouth bag filling apparatus, a filling spout having a tapered mouth, the latter having an elongated horizontal cross-section, a major horizontal cross-sectional axis thereof extending in a selected direction, said spout being located at a bag filling station, means located directly below such spout for grasping and holding closed the mouth of an open mouth bag, such means including a pair of flexible strips mounted with selected lengths thereof adjacent to and pressed toward one another, such lengths also extending in such selected direction, means for tensioning said strips, and means for moving said spout and belts relative to one another thereby to insert and withdraw said spout in said mouth.

13. In an open mouth bag filling apparatus, a vertically reciprocative filling spout having a tapered mouth with a major horizontal cross-sectional axis thereof extending in a selected direction, said spout being located at a bag filling station, means situated directly below such filling spout for grasping resiliently and holding closed the mouth of an open mouth bag, such means including a pair of endless belts mounted with aligned portions thereof adjacent to and pressed toward one another, such portions also extending in such selected direction, and means for controlling such reciprocative spout movement in response to bag movement with respect to such station.

14. In an open mouth bag filling apparatus, a vertically reciprocative relatively flat duck bill-like filling spout having a lip extending in a selected direction, said spout being located at a filling station, means situated directly below such filling spout for grasping and yieldingly holding closed the mouth of an open mouth bag, such means including a pair of endless belts mounted with aligned portions thereof adjacent one another, such portions also extending in such selected direction, and means for controlling such reciprocative spout movement in response to belt movement with respect to such station.

15. In an open mouth bag filling apparatus, a tubular bag filling spout having a mouth of substantially elongated horizontal cross-section and having movable jaw portions having a tapered vertical transverse cross-section forming a lip extending in a selected direction, spout moving means for raising and lowering said spout with respect to a bag filling station, and means below such spout and in such station for resiliently grasping an open mouth bag along and below the upper edge thereof and urging same towards a closed condition, said bag mouth grasping means being positioned for holding said mouth in the same direction as that of the lip of said spout.

16. In an open mouth bag filling apparatus, a tubular bag filling spout having a mouth of substantially elongated horizontal cross-section, spout moving means for raising and lowering said spout with respect to a bag filling station, means in such station for resiliently grasping an open mouth bag along and below the upper edge thereof and urging same towards a closed condition, said bag mouth grasping means being positioned for holding said mouth in the same direction as that of the elongation of said spout, and means for controlling said spout moving means in response to movement of a bag into said filling station.

17. In apparatus of the class described, a pair of endless belts mounted with selected portions thereof adjacent and facing one another, such selected portions being horizontal, said endless belts having mounting means including a plurality of pulleys positioned for holding such selected portions in the relative attitude aforementioned, means for feeding a succession of bags in between the adjacent selected portions of said belts, means for moving such belts to advance each bag to a bag filling station, such bags being of the open mouth type and being fed between such belts with the open upper mouth portions thereof between the belts with a selected portion protruding above such belts, preliminary bag mouth opening means, a bag spout for insertion into a preliminarily opened bag mouth, such bag spout being mounted above such belts and adapted for movement toward and away therefrom, said bag spout having a mouth portion including a pair of separable jaws, the mouth of the bag spout being of tapered configuration at least transversely and being elongated in the direction of motion of the oncoming bags, primary belt tensioning means including resilient means for placing said belts under tension, secondary belt tensioning means responsive to the movement of such bag spout to a position separated from the bag mouth for placing said endless belts under additional tension, and means for suspending the operation of the last-mentioned tensioning means in response to the lowering of the bag spout by a selected degree.

18. In apparatus for filling open mouth bags, the combination including a bag top conveyor comprising a pair of endless belts having selected portions thereof adjacent to and in alignment with one another and between which oncoming bags can be fed and grasped thereby for the purpose of moving same into a bag filling station, said endless belts having mounting means for placing such selected portions under tension for adequately gripping the top marginal portions of the oncoming bags, such belt mounting means having resilient means connected thereto for permitting the spreading of the mouth of a bag grasped by such belts in response to the spreading of the mouth of the bag by means hereinafter defined, a bag filling spout having a tapered mouth positioned above said endless belts in such filling station, means for preventing separation of said belts at the leading region of said bag filling station and thereby positioned at a region adjacent the leading portion of the mouth of the bag spout when inserted in the bag mouth, and means for preventing separation of said belts at the trailing region of said bag filling station and hence at the region of the trailing portion of the mouth of the bag spout when inserted in the bag mouth, said leading and trailing belt separation preventing means being separated by a distance less than the width of a bag.

19. In apparatus for filling open mouth bags, the combination including a bag top conveyor comprising a pair of endless belts having selected portions thereof adjacent to and in alignment with one another, and positioned for grasping therebetween oncoming bags for the purpose of moving same into a bag filling station, said endless belts having mounting means for placing such selected portions under tension for so grasping the top marginal portions of the oncoming bags, such belt mounting means having resilient means associated therewith for permitting the spreading of such belt portions in response to the spreading of the mouth of the bag grasped therebetween, a bag filling spout having a tapered mouth positioned above said endless belts in such filling station, means for feeding consecutively a plurality of bags to said endless belts, means for raising and lowering said filling spout, and means for selectively timing the feeding of said bags with the raising and lowering of said spout.

20. In apparatus of the class described, a pair of endless belts having selected portions thereof urged against one another along a selected path and adapted for receiving therebetween the top portions of an open mouth bag and for advancing same to a filling station, said bags being fed between such selected belt portions with a portion thereof extending above the belts, means for preliminarily opening the portion of the bag extending above such belts, a movable bag spout having a tapered mouth portion adapted for entering the preliminarily opened mouth of the bag, and yielding means for coacting with said belts for urging such selected portions yieldingly together whereby said selected portions can be spread to accommodate yieldingly such tapered mouth of the bag spout when the latter is inserted into and withdrawn from the bag mouth.

References Cited in the file of this patent

UNITED STATES PATENTS

| | | |
|---|---|---|
| 977,632 | Hoyt | Dec. 6, 1910 |
| 1,009,821 | Albertson et al. | Nov. 28, 1911 |
| 1,917,659 | Marshall | July 11, 1933 |
| 2,077,000 | Miller | Apr. 13, 1937 |
| 2,283,093 | Rosenthall et al. | May 12, 1942 |
| 2,546,193 | Lindstedt et al. | Mar. 27, 1951 |
| 2,676,442 | Gaubert | Apr. 27, 1954 |
| 2,725,168 | Lindstedt et al. | Nov. 29, 1955 |